US011430084B2

United States Patent
Stent et al.

(10) Patent No.: US 11,430,084 B2
(45) Date of Patent: Aug. 30, 2022

(54) SYSTEMS AND METHODS FOR SALIENCY-BASED SAMPLING LAYER FOR NEURAL NETWORKS

(71) Applicants: Toyota Research Institute, Inc., Los Altos, CA (US); Massachusetts Institute of Technology, Cambridge, MA (US)

(72) Inventors: Simon A. I. Stent, Cambridge, MA (US); Adrià Recasens, Cambridge, MA (US); Antonio Torralba, Cambridge, MA (US); Petr Kellnhofer, Cambridge, MA (US); Wojciech Matusik, Cambridge, MA (US)

(73) Assignees: TOYOTA RESEARCH INSTITUTE, INC., Los Altos, CA (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 526 days.

(21) Appl. No.: 16/121,978

(22) Filed: Sep. 5, 2018

(65) Prior Publication Data
US 2020/0074589 A1     Mar. 5, 2020

(51) Int. Cl.
G06T 3/40      (2006.01)
G06F 3/01      (2006.01)
G06N 3/08      (2006.01)
G06V 10/46     (2022.01)

(52) U.S. Cl.
CPC ............. G06T 3/40 (2013.01); G06F 3/013 (2013.01); G06N 3/08 (2013.01); G06V 10/462 (2022.01)

(58) Field of Classification Search
CPC combination set(s) only.
See application file for complete search history.

(56) References Cited

U.S. PATENT DOCUMENTS 6,654,506 B1    11/2003  Jiebo et al.
8,200,045 B2     6/2012  Olivier et al.
8,433,105 B2     4/2013  In et al.
(Continued)

FOREIGN PATENT DOCUMENTS

CN      104850836 B    4/2018
WO      200101685 A1   1/2001

OTHER PUBLICATIONS

Yu et al., Nov. 2010, "Saliency-Based Compressive Sampling for Image Signals", IEEE Signal Processing Letters, vol. 17 No. 11, pp. 973-976 (Year: 2010).*

(Continued)

*Primary Examiner* — Zhiyu Lu
(74) *Attorney, Agent, or Firm* — Dinsmore & Shohl LLP

(57) ABSTRACT

A method includes receiving, with a computing device, an image, identifying one or more salient features in the image, and generating a saliency map of the image including the one or more salient features. The method further includes sampling the image based on the saliency map such that the one or more salient features are sampled at a first density of sampling and at least one portion of the image other than the one or more salient features are sampled at a second density of sampling, where the first density of sampling is greater than the second density of sampling, and storing the sampled image in a non-transitory computer readable memory.

21 Claims, 6 Drawing Sheets

(56) References Cited

U.S. PATENT DOCUMENTS

| | | | |
|---|---|---|---|
| 8,531,557 B2 | 9/2013 | Yiu et al. | |
| 8,571,353 B2 | 10/2013 | Shinji | |
| 8,797,261 B2 | 8/2014 | Xiaoru | |
| 9,298,980 B1* | 3/2016 | Yuan | G06K 9/00456 |
| 2008/0201282 A1 | 8/2008 | Garcia et al. | |
| 2009/0060273 A1* | 3/2009 | Stephan | G06K 9/00805 |
| | | | 382/103 |
| 2010/0189354 A1* | 7/2010 | de Campos | G06K 9/00597 |
| | | | 382/190 |
| 2011/0109720 A1* | 5/2011 | Smolic | H04N 13/122 |
| | | | 348/43 |
| 2011/0235910 A1* | 9/2011 | Soceanu | G06K 9/00295 |
| | | | 382/173 |
| 2013/0342758 A1* | 12/2013 | Greisen | G06T 3/0012 |
| | | | 348/441 |
| 2014/0254922 A1* | 9/2014 | Wang | G06K 9/4671 |
| | | | 382/159 |
| 2014/0270553 A1* | 9/2014 | Zund | H04N 19/14 |
| | | | 382/233 |
| 2017/0206426 A1* | 7/2017 | Schrier | G06K 9/6273 |
| 2017/0206440 A1* | 7/2017 | Schrier | G05D 1/021 |
| 2017/0308770 A1 | 11/2017 | Jetley et al. | |
| 2019/0251707 A1* | 8/2019 | Gupta | G06N 3/0454 |

OTHER PUBLICATIONS

Max Jaderberg, Karen Simonyan, Andrew Zisserman, Koray Kavukcuoglu; "Spatial Transformer Networks", online article, Feb. 4, 2016. URL: https://arxiv.org/abs/1506.02025.

* cited by examiner

SYSTEMS AND METHODS FOR SALIENCY-BASED SAMPLING LAYER FOR NEURAL NETWORKS

TECHNICAL FIELD

The present specification generally relates to systems and methods for down-sampling image data to use in a convolutional neural network and, more specifically, to systems and methods for improving spatial down-sampling of input data using a saliency-based distortion layer that may be integrated into any convolutional neural network.

BACKGROUND

Many modern neural network models used in computer vision have input size constraints. These constraints exist for various reasons. By restricting the input size, one can control the time and computation required during training and testing thereby benefiting from efficient batch training on a general processing unit. However, uniformly limiting the input dataset can result in a decrease in performance, as relevant fine details may be lost within the uniformly sampled dataset.

Accordingly, a need exists for improved systems and methods for sampling datasets to reduce the loss of relevant details.

SUMMARY

In embodiments, a method includes receiving, with a computing device, an image, identifying one or more salient features in the image, and generating a saliency map of the image including the one or more salient features. The method further includes sampling the image based on the saliency map such that the one or more salient features are sampled at a first density of sampling and at least one portion of the image other than the one or more salient features are sampled at a second density of sampling, where the first density of sampling is greater than the second density of sampling, and storing the sampled image in a non-transitory computer readable memory.

In some embodiments, a computer-implemented system includes a saliency network, a grid generator, a sampler; and a processor and a non-transitory computer readable memory storing computer readable instructions. The computer readable instructions, when executed by the processor, cause the processor to: receive an image, identify one or more salient features within the image, and generate, with the saliency network, a saliency map of the image including the one or more salient features. The computer readable instructions, when executed by the processor, may further cause the processor to: generate, with the grid generator, a sampling grid based on the saliency map, where the sampling grid defines a density of sampling for portions of the image such that the one or more salient features are sampled at a first density of sampling and at least one portion of the image other than the one or more salient features are sampled at a second density of sampling, where the first density of sampling is greater than the second density of sampling, sample, with the sampler, the image based on the sampling grid, thereby generating a sampled image, and store the sampled image in the non-transitory computer readable memory.

In some embodiments, a system includes a camera configured to capture a higher resolution image, a computing device having a processor and a non-transitory computer readable memory communicatively coupled to the camera, and a computer readable instruction set. The computer readable instruction set, when executed by the processor, causes the processor to: receive the higher resolution image from the camera, down-sample the higher resolution image to a lower resolution image, where a resolution of the lower resolution image is lower than a resolution of the higher resolution image, identify one or more salient features within the lower resolution image, and generate, with a saliency network, a saliency map of the lower resolution image including the one or more salient features. The computer readable instruction set, when executed by the processor, may further cause the processor to: generate, with a grid generator, a sampling grid based on the saliency map, where the sampling grid defines a density of sampling for portions of the lower resolution image such that the one or more salient features are sampled at a first density of sampling and at least one portion of the lower resolution image other than the one or more salient features are sampled at a second density of sampling, where the first density of sampling is greater than the second density of sampling, sample, with a sampler, the higher resolution image based on the sampling grid, thereby generating a sampled image, and store the sampled image in the non-transitory computer readable memory.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to systems and methods for improving spatial down-sampling of input data using a saliency-based distortion layer (which is also referred to herein as a saliency sampler system) that can be integrated into any convolutional neural network (CNN). This allows a neural network to automatically select features in images (e.g., a creature's eyes) and preserve them while compressing the remaining portions of the image and/or time-compressing a video while preserving the pertinent parts for the task of the CNN. In some embodiments, the CNN includes a saliency-based distortion layer that forms a saliency map by automatically selecting salient features from image data (e.g., still images or video). The saliency-based distortion layer may subsequently sample salient portions of the original high-resolution image more densely than the less or non-salient portions of an original high-resolution image using a sampling grid based on the saliency map. As a result, a sampled image based on the saliency map may be generated. The sampled image may be utilized for training a CNN, may be used as an input to other layers of the CNN, or the like.

In general, the saliency-based distortion layer reconfigures an image or video feed such that important features (e.g., a driver's eyes or a road hazard) may be automatically recognized and preserved at a higher resolution than other less salient portions of the image (e.g., the background portion of a cabin of a vehicle). This may allow for the down-sampling of an image or video without losing the important and salient features otherwise lost when reducing an image size for implementation in a CNN. Implementation of the saliency-based distortion layer within a CNN may allow a system to automatically decide important features (e.g., through a trained saliency network) without specific knowledge and/or input from a user. The CNN implementing the saliency-based distortion layer can learn what is salient in order to pre-select what is important and subject to further processing. In some embodiments, the saliency-based distortion layer can also use time-based compression, such as finding a key portion of a video (e.g., a driver falling asleep) and preserve that portion of the video, while compressing the other portions of the video.

Embodiments of the present disclosure are directed to systems and methods for providing a saliency-based distortion layer for a convolutional neural network (CNN). The following will now describe these systems and methods in more detail with reference to the drawings where like number refer to like structures.

Figure 1:
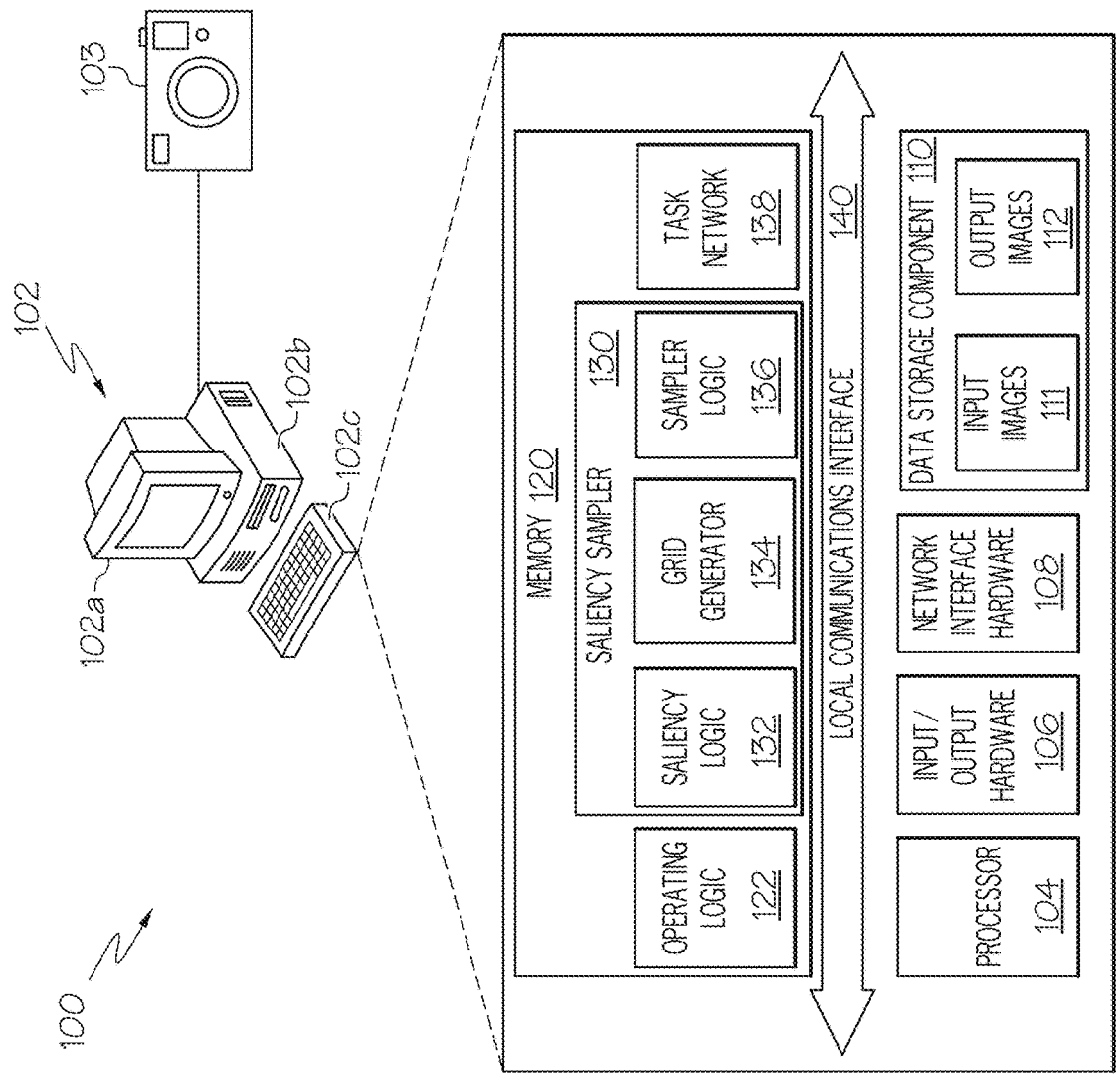
FIG. 1 depicts an illustrative system for providing a saliency-based distortion layer for a CNN, according to one or more embodiments shown and described herein.

Turning now to FIG. 1, an illustrative system 100 for providing a saliency-based distortion layer for a CNN is depicted. The system 100 may include a computing device 102 communicatively coupled to a camera 103. In general, the computing device 102 may include a display 102a, a processing unit 102b and an input device 102c, each of which may be communicatively coupled together. More particularly, the computing device 102 may include a processor 104, input/output hardware 106, network interface hardware 108, a data storage component 110 (which may store input images 111, output images 112, and/or other data), and a memory 120. The memory 120 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 102 and/or external to the computing device 102.

The processor 104 may include any processing component operable to receive and execute instructions (such as from a data storage component 110 and/or the memory 120).

Additionally, the input/output hardware 106 may include and/or be configured to interface with the camera 103, sensors, devices, and other components. The data storage component 110 may comprise RAM, ROM, flash memories, hard drives, DVDs, CDs, SD or any non-transitory memory device capable of storing data such as electronic files, images, video, configuration values, or the like. It should be understood that the data storage component 110 may reside local to and/or remote from the computing device 102 and may be configured to store one or more pieces of data for access by the computing device 102 and/or other components. The data storage component 110 may include input images 111, which may be received from the camera 103, or another computing device or storage device. The data storage component 110 may also include output images 112. The output images 112 may be sampled images generated by the saliency-based distortion layer implemented by logic components of the saliency sampler 130.

The memory 120 may comprise RAM, ROM, flash memories, hard drives, or any non-transitory memory device capable of storing machine-readable instructions such that the machine-readable instructions can be accessed and executed by the processor 104. The machine-readable instruction set may comprise logic or algorithm(s) written in any programming language of any generation (e.g., 1GL, 2GL, 3GL, 4GL, or 5GL) such as, for example, machine language that may be directly executed by the processor 104, or assembly language, object-oriented programming (OOP), scripting languages, microcode, etc., that may be compiled or assembled into machine readable instructions and stored in the memory 120. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single memory 120, other embodiments may include more than one memory.

The memory 120 may store the operating logic 122, the saliency sampler 130, which includes logic components such as saliency logic 132, a grid generator 134, and sampler logic 136 for implementing the saliency-based distortion layer, and a task network 138, which may include logic for implementing a particular task of the CNN. The CNN task network 138 may include gaze position estimations, object classifications, attribute classifications, or the like. The operating logic 122, the saliency sampler 130 and each of its logic components, and the task networks 138 may each include a plurality of different pieces of logic, each of which may be embodied as a computer program, firmware, and/or hardware, as an example.

A local communications interface 140 is also included in FIG. 1 and may be implemented as a bus or other communication interface to facilitate communication among the components of the computing device 102. The network interface hardware 108 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the computing device 102 and other computing devices, such as a mobile device, a server, etc.

The operating logic 122 may include an operating system and/or other software for managing components of the computing device 102. As described in more detail herein the saliency sampler 130 may reside in the memory 120 and may be configured to cause the processor 104 to transform an input image into a sampled image that maintains a higher degree of resolution for salient features as compared to less or non-salient features within the image or video feed. The saliency logic 132 may include instructions for implementing a saliency network to identify salient portions of an image for a defined task such as determining gaze position, object classifications, attribute classifications, or the like. The grid generator 134 may include instructions for generating a sampling grid that defines sampling densities for portions of an image based on the saliency map that identifies the salient portions of the image determined by the saliency network. The sampler logic 136 may include instructions for utilizing the saliency map and the sampling grid to sample an original high-resolution image or the low-resolution image, thereby generating a sampled image for display or use by other layers of the CNN.

It should be understood that while the components in FIG. 1 are illustrated as residing within the computing device 102, this is merely an example. In some embodiments, one or more of the components may reside external to the computing device 102. It should also be understood that, while the computing device 102 is illustrated as a single device, this is also merely an example. In some embodiments, the operating logic 122, the saliency sampler 130 (which may include the saliency logic 132, the grid generator 134, the sampler logic 136 and/or other logic), and logic for the task network 138 may reside on different computing devices. As an example, one or more of the functionality and/or components described herein may be provided by a computing device and/or mobile device, which may be coupled to the computing device 102 via a network, such as a local network and/or a wide area network. As such the system may be implemented in a distributed computing environment where various computing devices carry out specific tasks and functions.

Additionally, while the computing device 102 is illustrated with the operating logic 122, the saliency sampler 130 (which may include the saliency logic 132, the grid generator 134, the sampler logic 136 and/or other logic), and logic for the task network 138 as separate logical components, this is also an example. In some embodiments, a single piece of logic may cause the computing device 102 to provide the described functionality.

Figure 2:
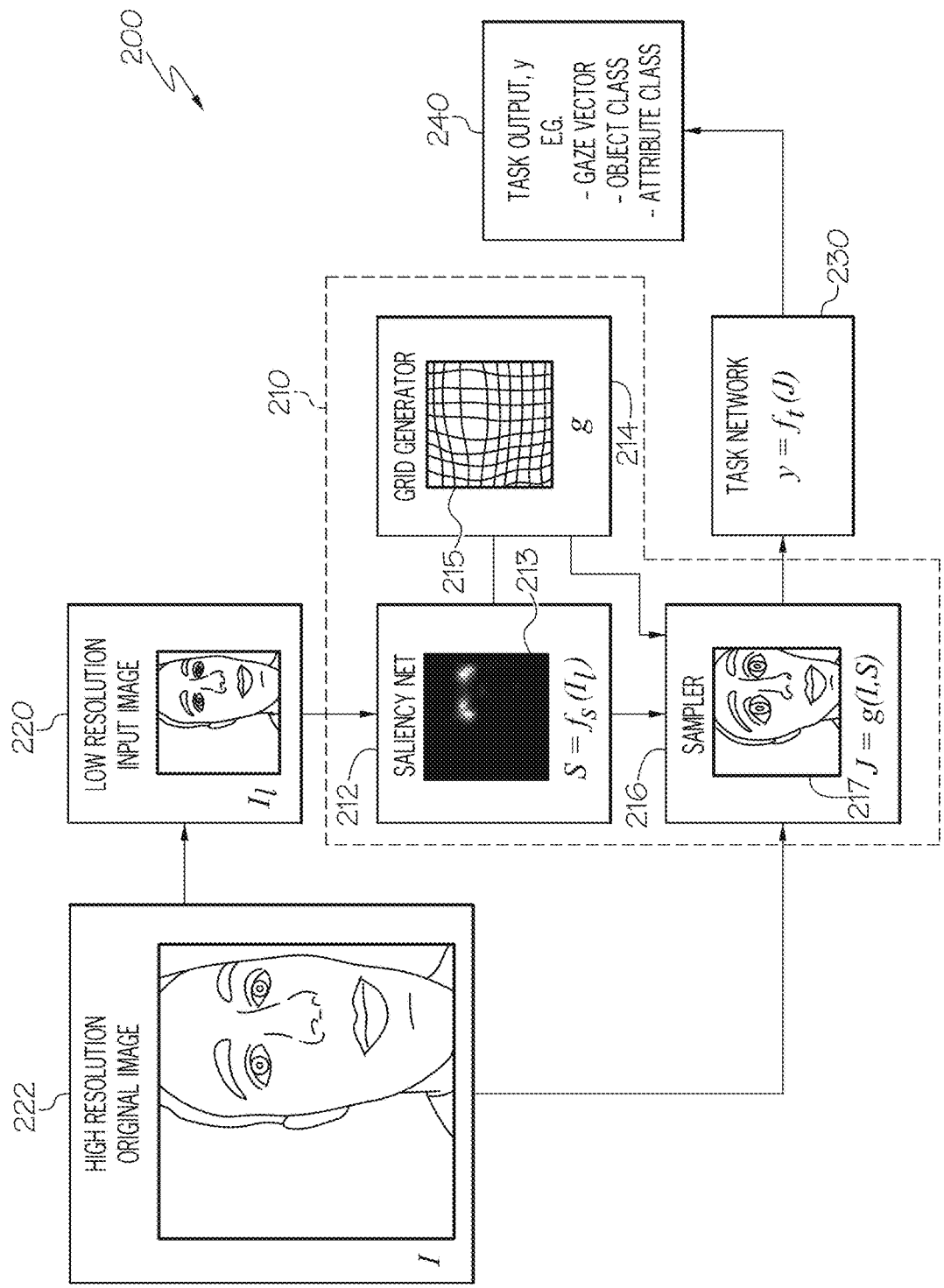
FIG. 2 depicts a flow diagram of a CNN implementing a saliency-based distortion layer including inputs and outputs, according to one or more embodiments shown and described herein.

Turning to FIG. 2, a flow diagram of a CNN 200 implementing a saliency-based distortion layer 210 including inputs and outputs according to embodiments described herein is depicted. The saliency-based distortion layer 210 for CNNs helps improve the spatial sampling of input data for a given task. The saliency-based distortion layer 210 that is described herein may be added as a processing block to existing task networks and trained altogether in an end-to-end fashion. An effect of the layer is to efficiently estimate how to sample from the original data in order to boost task performance. For example, for an image classification task in which the original data might range in size up to several megapixels, but where the desired input images to the task network are much smaller, the saliency-based distortion layer 210 learns how best to sample from the underlying high-resolution data in a manner which preserves the task-relevant information better that uniform down-sampling. In some embodiments, the saliency-based distortion layer 210 has the effect of creating distorted, caricature-like intermediate images, in which idiosyncratic elements of the image that improve task performance are zoomed and exaggerated (or in other words more densely sampled than less or non-salient portions).

As mentioned above, many modern neural network models used in computer vision have input size constraints. These constraints exist for various reasons. By restricting the input size, the time and computational resources required during training and testing may be controlled, which may also provide the benefit of training on a general processing unit (GPU). In general, when the target input size is smaller than the images in the original dataset, the standard approach is to uniformly down-sample the input images. For example, a commonly used 224×224 pixel input may be used when training CNNs designed for carrying out the task of classification (i.e., classifiers), despite access to image sizes in the several megapixels range in the original dataset.

Uniform down-sampling is attractive in many situations because it is generally simple to implement and effective. However, it has the result of being lossy for tasks that require information from different spatial resolutions at different locations. In such cases, sampling the salient regions at the necessary and possibly diverse locations and scales becomes essential. As described in detail herein, the saliency-based sampling layer may be a plug-in module appended to the start of any input-constrained network and used to improve down-sampling in a task-specific manner. Given a target image input size, the saliency-based distortion layer 210 learns to allocate pixels in that target to regions in the underlying image which are found to be particularly important to the task at hand. In doing so, the layer transforms the input image, creating a deformed version in which task-relevant parts of the image are emphasized and irrelevant parts are suppressed, for example, like a caricature of a face that tries to magnify those features that make a face stand out from the average.

Referring specifically to FIG. 2, the saliency-based distortion layer 210 includes a saliency network 212 configured to estimate and identify salient portions of an input image 220. The saliency network 212 may receive an input image 220, which may be a previously down-sampled low-resolution image or an original high-resolution image 222. The input image 220 may be down-sampled only to the extent necessary to efficiently carry out saliency mapping. The size of the input image may be determined by the computational time and resources available. That is, since the saliency-based distortion layer 210 may be implemented as an initial step to a CNN, the saliency-based distortion layer 210 is not necessarily limited to the same input data resolution constraints as the CNN. For example, the CNN may be restricted to receiving image data with a resolution of 224×224 pixels. However, since the saliency-based distortion layer may first receive the image data, the resolution of the image data to the saliency-based distortion layer 210 need not similarly constrained. For example, the low-resolution input image to the saliency-based distortion layer 210 may be on the order of tens, hundreds, thousands, millions, billions or more pixels. Therefore, the input image 220 to the saliency network 212 of the saliency-based distortion layer 210 may be the original high-resolution image 222, for example, captured by a camera, or a lower resolution image.

The saliency network 212 may be trained to identify salient portions of an image for utilization during a particular task. For example, the saliency network 212 may be trained to identify salient portions of an image relating to the eyes of a creature captured within the image. Such salient portions may be utilized by a CNN having a task network for determining the gaze position (e.g., a gaze vector, direction or the like). As another example, the saliency network 212 may be trained to identify salient features for fine-grained image recognition and/or classification. These are only two examples and it should be understood that the saliency network 212 may be trained and/or configured to identify salient portions within an image for a variety of tasks.

The saliency network 212 may create a saliency map 213 for the input image 220. The saliency map 213 may be visually represented as a heat map that identifies salient features or portions with a first intensity (e.g., a color or a shade intensity of a color) and less salient and non-salient features or portions of the image with other colors or shades of a color. In some embodiments, the image may be sampled based on the saliency map such that the one or more salient features are sampled at a first density of sampling and at least one portion of the image other than the one or more salient features are sampled at a second density of sampling, wherein the first density of sampling is greater than the second density of sampling.

In some embodiments, the saliency map 213 may then be utilized by the grid generator 214 in creating a sampling grid 215. The sampling grid 215 created by the grid generator 214 defines densities of sampling for portions of the image based on how salient the portion of the image is as determined from the saliency map. For example, the sampling grid defines a density of sampling (e.g., the percentage or amount of pixels to keep or reduce the portion of the image by) of the image such that a first density of sampling for a salient feature or portion of the image is greater than a second density of sampling for a less salient or non-salient feature or portion of the image. Additionally, the sampling grid may provide a mapping for the original coordinates to the sampled image coordinates since the density of the sampling distorts the coordinate system of the image through the magnification of important regions which get sampled more often than others.

The saliency-based distortion layer 210 further includes a sampler 216, which receives the saliency map 213 from the saliency network 212 and the sampling grid 215 from the grid generator 214. The sampler 216 also receives as an input the original high-resolution image 222. The original high-resolution image 222 is sampled by the sampler 216 based on the saliency map 213 and the sampling grid 215. For example, portions of the sampling grid 215 corresponding to salient portions identified within the saliency map 213 may be used to determine the portions of the original high-resolution image 222 to sample and the density at which to sample. The sampler 216 transforms the original high-resolution image 222 into a sampled image 217. As a result, portions of the sampled image 217 may appeared enlarged and distorted with respect to the original high-resolution image 222. That is, because the overall size of the original high-resolution image 222 has been disproportionately sampled. In embodiments where the sampled image 217 has not been reduced to the necessary input size for a task network of the CNN, the sampled image 217 may further be uniformly down-sampled without losing focus and attention within the salient portions of the image since they have been exaggerated with respect to the original high-resolution image 222.

In some embodiments, the sampled image 217 generated by the saliency-based distortion layer 210 may be stored in a non-transitory computer readable memory 120 (FIG. 1) for use in a subsequent task network 230 (FIG. 2) of a CNN 200 or displayed on a display 102*a* (FIG. 1) to a user for analysis and review. Similarly, the sampling grid 215 and/or the saliency map 213 may also be stored in a non-transitory computer readable memory 120 (FIG. 1) for use in a subsequent task network 230 (FIG. 2) of a CNN 200 or displayed on a display 102*a* (FIG. 1) to a user for analysis and review.

In some embodiments, the sampled image 217 may be used as input data to a task network 230 of a CNN 200. The task network 230 may include one or more neural network layers configured to carry out a predetermined task such as gaze position (e.g., determining a gaze vector from eyes and/or head position of a creature), object classification and/or attribute classification (e.g., determining one breed of dog from another breed of dog). The task network 230 in turn may output 240 a gaze vector, object class, attribute class, object name, or the like. The output 240 may be used in backpropagation methods for training the saliency-based distortion layer 210 and/or the task network 230. The output 240 may also be used in applications such as determining where a driver is looking to determine whether they are aware of objects or people in their environment. By way of another example, the output 240 may be used in applications such as determining a type of plant, a type of fish, a breed of dog, or one object from another object within an environment.

Figure 3:
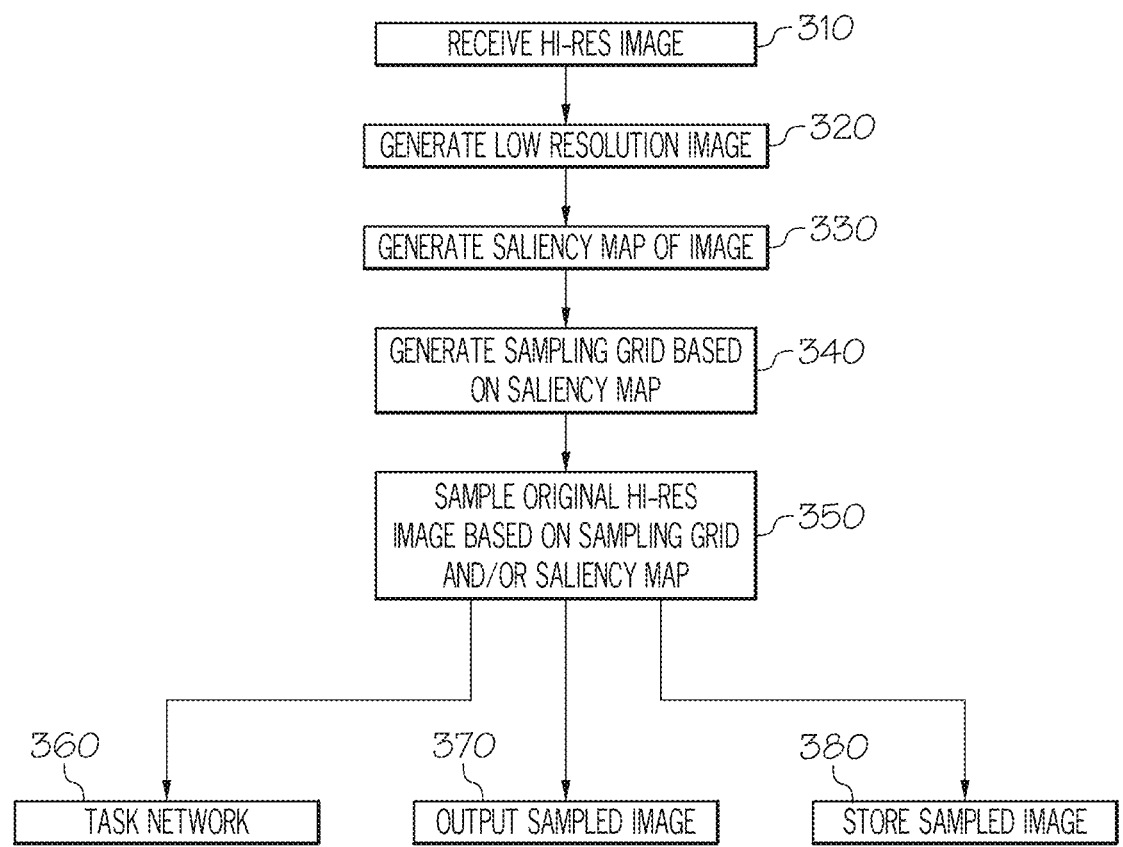
FIG. 3 depicts an illustrative flow chart for a method of providing a saliency-based distortion layer, according to one or more embodiments shown and described herein.

Referring now to FIG. 3, an illustrative flow chart of for a method of providing a saliency-based distortion layer is depicted. As described in detail above with reference to FIG. 2, the saliency-based distortion layer, generally, may receive, as an input, an image having any resolution, determine salient portions within the image and sample the image with varying sampling densities based on the salient portions within the image. In some embodiments, the method, at block 310, includes receiving a high-resolution image, for example, from a camera or a dataset of high-resolution images. In some cases the high-resolution image received at block 310, may be initially down-sampled at block 320 to generate a low-resolution image. At block 330, either the high-resolution image or a lower resolution image of the high-resolution image may be processed using a saliency network to generate a saliency map of the image. The saliency map graphically represented by way of a heat map and/or stored by a computing device by assigning values corresponding to a degree of saliency of a portion of the image. In embodiments, salient features or portions of the image may be utilized to generate a sampling grid at block 340. The sampling grid defines the density of sampling for portions of the image based on the degree of saliency of the corresponding portion as defined in the saliency map. Additionally, the sampling grid may provide a correlation between the coordinate system of the input image and the coordinate system of a sampled image as a result of the varying sampling densities over portions of the image. An example of this is further described with reference to FIG. 5.

At block 350, either the original high-resolution image or the lower resolution image is retrieved and sampled according to the saliency map and/or the sampling grid. As a result, a sampled image may be generated which exaggerates portions of the image which are of particular importance to the task the saliency-based distortion layer is implemented. In other words, salient portions of the image are sampled with a greater pixel density than portions that are less salient or not salient to the task. As referred to above, the task may be any number of image processing tasks including for example determine the gaze position (i.e., a gaze vector) of a creature within the image, determining a classification of an object or attributes, or the like.

Once the sampled image is generated at block 350, the sampled image may be, at block 360, input to the next layer (i.e., the task network) of the CNN for further processing; at block 370, stored in a memory or storage device for later use; and/or at block 380, output to a display for review and analysis. It should be understood that the above-described method is only an example. In some embodiments, portions of the method may be supplemented or excluded by those of skill in the art to accomplish the same general results of sampling an image based on image saliency.

Figure 4:
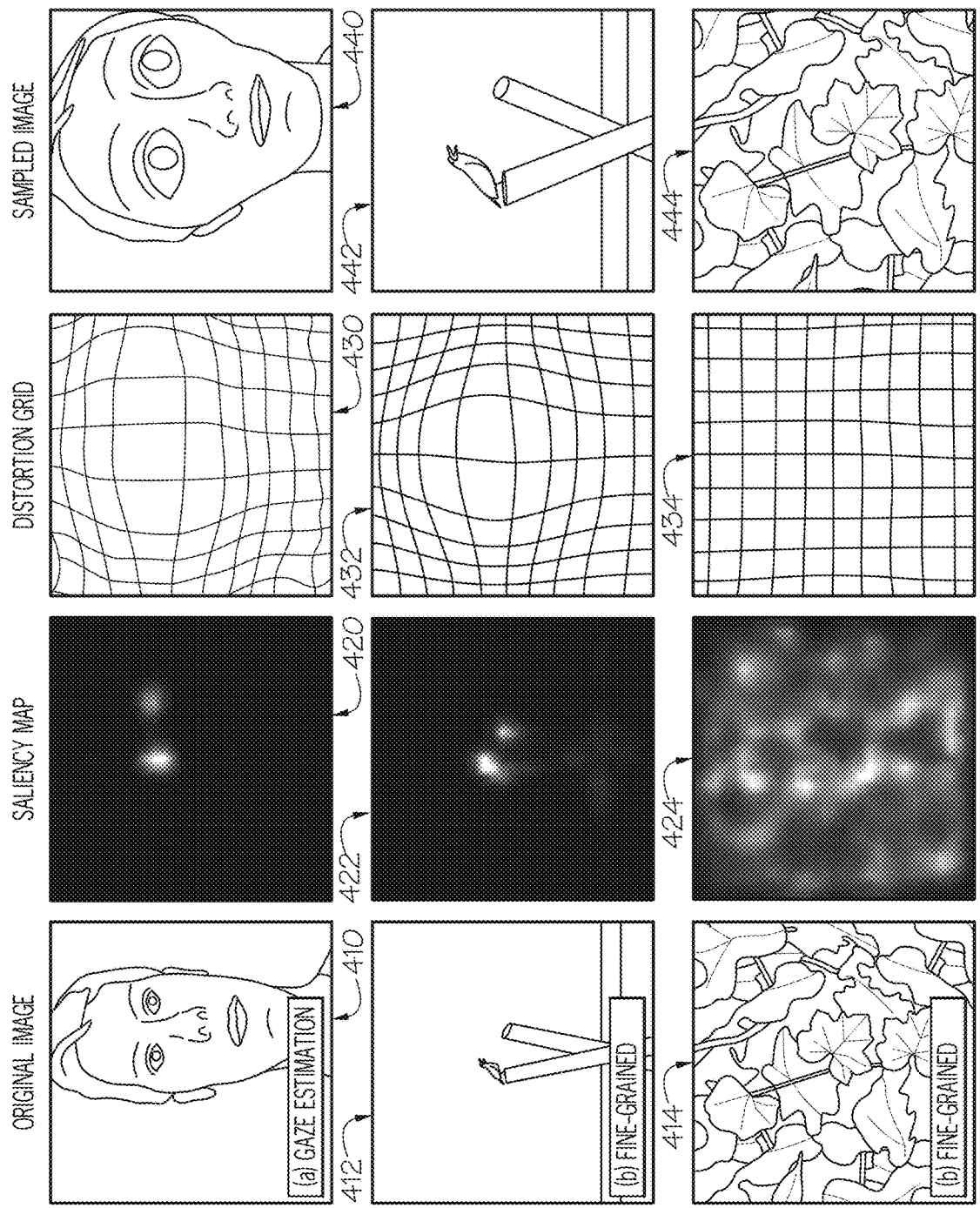
FIG. 4 depicts illustrative examples of processing an original image to a sampled image, according to one or more embodiments shown and described herein.

Referring now to FIG. 4, illustrative examples of processing an original image to a sampled image utilizing the systems and methods described herein are depicted. The original images and sampled images are represented as line drawings, however, it should be understood that the original image and sample image may be full color and/or full resolution images or video feeds captured by a camera. FIG. 4 depicts four sets of example images and outputs as a result of the saliency-based distortion layer. These include original images (410, 412, 414), saliency maps (420, 422, 424), distortion grids (430, 432, 434), and sampled images (440, 442, 444). Images 410, 420, 430, and 440 relate to the task of gaze estimation. As such, the original image 410 is of a view of a person's face and eyes. The saliency network for the gaze estimation task may be trained to identify portions of the image 410 that contain a person's eyes as salient as shown, for example, in the saliency map 420. Image 430 is an example distortion grid or, as also referred to herein, a sampling grid. As it may be observed, the hot spots of the saliency map 420 (i.e., heat map) correspond to the larger grid blocks (or contours) of the distortion grid 430, indicating a portion of the original high-resolution image 410 will be more densely sampled. When the original image 410 is sampled according to the saliency map 420, the sampled image 440 results. In comparing the sampled image 440 with the original image 410, it is observable that the portions of the image that include the eye features are exaggerated (i.e., magnified). That is, because for a gaze estimation task, the eyes are a key feature within image data that is analyzed to determine the gaze direction of the person (i.e., creature).

Still referring to FIG. 4, original image 412 depicts a scene of a bird perched on a fence in a field. The task associated with these set of images 412, 422, 432, and 442 relates to determining a classification for an object or objects, which is also referred to as a fine-grained classification problem. For such a task, the saliency network is trained or configured to identify small details within an image that may be indicative of objects requiring classification. For example, saliency map 422 depicts a heat map where the bird and portions of the fence are identified as salient portions of the image. Subsequently, the grid generator creates a distortion grid 432 that will provide for a higher density of sampling. As an illustrative example result, the sampled image 442 depicts the bird and fence in an exaggerated view (e.g., magnified view). In a similar example, which also relates to the task of addressing the fine-grained classification problem, it can be observed within the original image 414 that no particular detail or object appears to be present, rather the original image depicts a number of leaves, grass, and sticks. To that extent, the saliency network generates a saliency map 424 where a large amount of the image is considered salient. Furthermore, the grid generator provides only minor adjustments to the proportionality of sampling densities within portions of the image, as depicted by the distortion grid 434. The sampling remains analogous to a uniform sampling grid. Finally, as a result, the sampled image 444 appears similar to that of the original image 414. That is, when no clear salient area is detected, the sampler may default to a near-uniform sampling.

Figure 5:
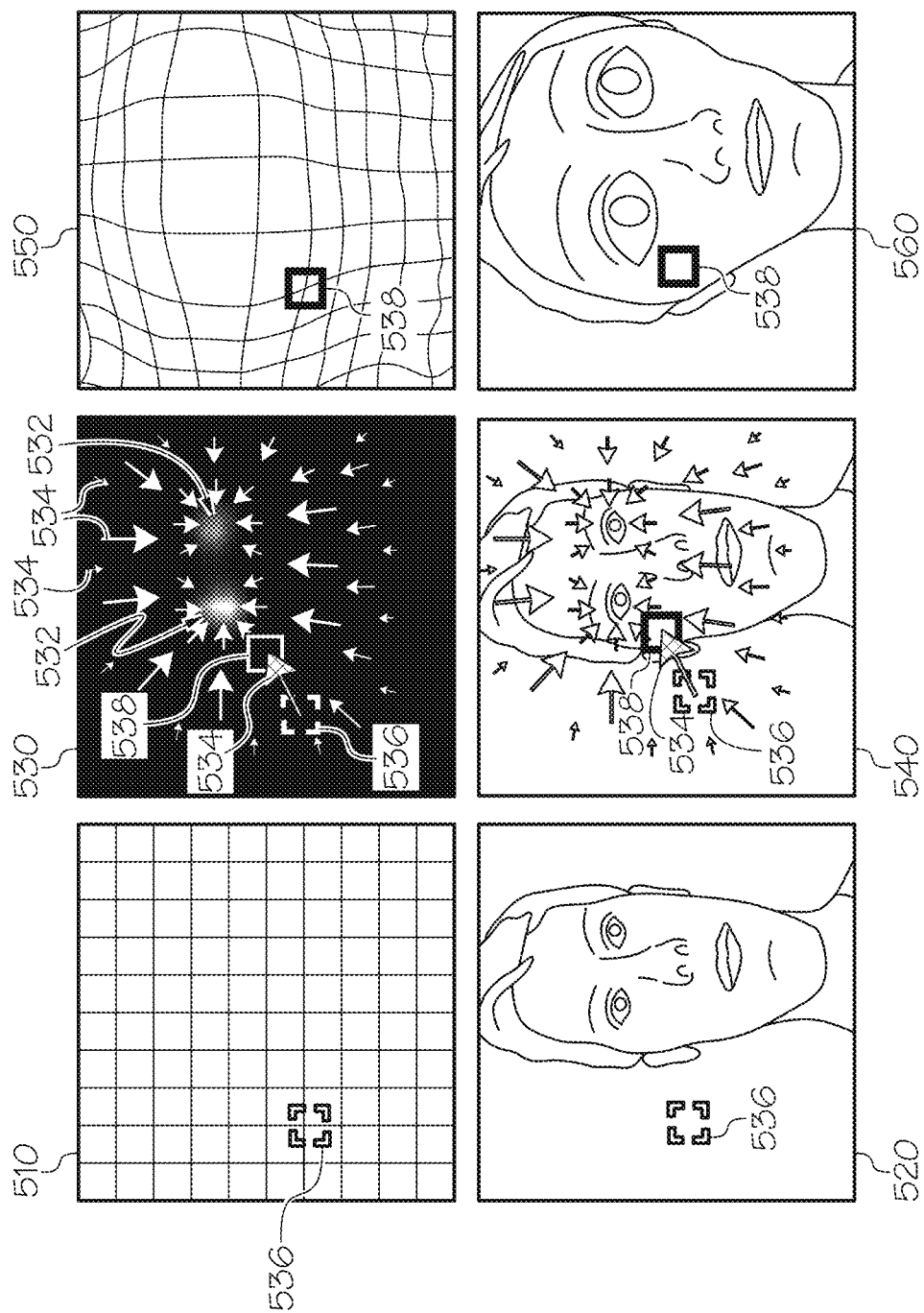
FIG. 5 depicts an illustrative example of determining the density for sampling portions of an image with the saliency sampler, according to one or more embodiments shown and described herein.

Referring now to FIG. 5, an illustrative example of determining the density for sampling portions of an image with the saliency sampler is depicted. For example, given an original high-resolution image 520 having an arbitrary size (e.g., resolution), the system generates a sampled image 560 bounded, for example, by size M×N pixels that is suitable for input into a task network 230 (FIG. 2). Typically, CNNs rescale the input image to a task network without exploiting the relative importance of pixels in the original high-resolution image 520. However, in embodiments described herein, to improve the functionality of a task network, for example within a CNN, input images to the task network may be disproportionately down-sampled with respect to relevant areas and details within the original high-resolution image 520 that may be advantageous to the functionality of the task network. The system may achieve this by analyzing the original high-resolution image 520 and then sampling areas of the original high-resolution image 520 in proportion to their perceived importance. That is, the CNN model may capture the benefit of increased resolution without significant and/or additional computational burdens or the risk of overfitting. For example and without limitation, the sampling process may be considered in two stages. In the first stage, a CNN may be used to produce a saliency map 530 from the original high-resolution image 520. This map may be task specific, as for each different task different regions of the original high-resolution image 520 may be relevant. In the second stage, the original high-resolution image 520 may be sampled in proportion to their importance as indicated by the saliency map 530. In some embodiments, a softmax operation may be applied to the saliency map to normalize the output map.

The following description, with reference to FIG. 5, provides an illustrative example with detail into how sampling by the system may be achieved. In embodiments, the sampler (g) takes as an input the saliency map 530 (S) and the original high-resolution image 520 (I) and generates a sampled image 560 [J=g(I, S)]. The saliency map 530 (S) describes saliency as a mass 532 attracting neighboring pixels (e.g., illustrated by arrows 534). For example, pixel 536 of the sampled image 560 (J) samples from a location 538 in the original high-resolution image 520 (I) which is offset by this attraction, for example as shown by arrow 534 and defined by the saliency sampler [g(I, S)]. This distorts the coordinate system of the original high-resolution image 520 and magnifies important regions that get sampled more often than others.

In some embodiments, the sampler (g) may also utilize a distortion grid 550, which, in part, provides a mapping of the coordinate space between the sampled image 560 (i.e., the distortion grid 550) and the coordinate space of the original high-resolution image 520 (i.e. the original coordinate space 510). This mapping may be expressed in a standard form as two functions u(x, y) and v(x, y) such that J(x, y)=I(u(x, y), v(x, y)). The grid sampler may use the mapping u and v to generate the new image J. As such, the design of u and v is to map pixels proportionally to the normalized weight assigned to them by the saliency map 530. For example, assuming that u(x, y) and v(x, y) range from 0 to 1, an exact approximation to the problem would be to find u and v such that:

$$\int_0^{u(x,y)} \int_0^{v(x,y)} S(x',y') dx' dy' = u(x,y) v(x,y) \qquad \text{Eq. 1}$$

However, while finding u and v in this manner is possible, the solutions may be computationally costly. For this reason, an alternative approach suitable for use in a CNN is provided. By leveraging the idea that each pixel (x', y') is pulling other pixels with a force S(x', y'), as depicted illustratively in FIG. 5, the addition of a distance kernel k((x, y),(x', y')), results in equations 2 and 3, below.

$$u(x, y) = \frac{\sum_{x',y'} S(x', y') k((x, y), (x', y')) x'}{\sum_{x',y'} S(x', y') k((x, y), (x', y'))} \qquad \text{Eq. 2}$$

$$v(x, y) = \frac{\sum_{x',y'} S(x', y') k((x, y), (x', y')) y'}{\sum_{x',y'} S(x', y') k((x, y), (x', y'))} \qquad \text{Eq. 3}$$

This formulation holds certain desirable properties for the functions of u and v, notably sampled areas and convolutional form. Regarding sampled areas, higher saliency areas get more densely sampled. Pixels with most of the saliency mass will attract all the other pixels to them. Note that kernel k can act as a regularizer to avoid corner cases where all the pixels may converge to the same value. For example, a Gaussian kernel with σ set to one third of the width of the saliency map may adjust for corner cases for a variety of settings. This formulation also allows for the ability to compute u and v with simple convolutions, which may be necessary for an efficient implementation with a CNN system. That is, this layer may easily be added in a standard CNN and preserve differentiability needed for training by backpropagation. Furthermore, in some embodiments, border values may be applied to equations 2 and 3 to reduce any undesirable bias towards the center of the image.

The following will now provide an explanation into how the saliency sampler may be trained. The saliency sampler can be plugged into any convolutional neural network ($f_t$) in order to improve its performance through relevant subsampling of a higher resolution input. Since the module is end-to-end differentiable, it may be trained through a full pipeline with standard optimization techniques. An example of a complete pipeline is depicted in FIG. 2. In some embodiments, a low-resolution image ($I_l$) may be obtained from an original high-resolution image (I). The low-resolution image ($I_l$) may be used by the saliency network ($f_s$) to compute a saliency map $S=f_s(I_l)$, where task relevant areas of the image are assigned higher weights. A sampler g may implemented to sample the original high-resolution image I according to the saliency map, thereby obtaining the sampled image J=g(I, S). The sample image may have the resolution necessary to be input to the task network ($f_t$) or a uniform down-sampling process may be implemented to achieve the necessary resolution. The task network ($f_t$) may then be used to compute the final output y=f(J), for example, which may be a gaze estimation, object class, or any other task the CNN is designed to carry out. In such embodiments, both ($f_s$) and ($f_t$) may include learnable parameters so that they may be trained jointly for the particular task.

Experiments and Benchmarking

The following discussion of experiments relates to the implementation of the saliency sampling system and method for two computer vision problems: gaze-tracking and fine-grained image recognition. For both tasks, the benefit of augmenting standard methods on commonly used datasets with the saliency sampling system and method described herein was examined. The saliency sampling system and method is also compared against other CNN modules designed for carrying out the same tasks of gaze-tracking and fine-grained image recognition. As an architecture for the saliency network $f_s$, in both tasks the initial 10 layers of ResNet-18 which was pretrained on the ImageNet Dataset and one final 1×1 convolutional layer was used to reduce the dimensionality of the saliency map S.

Referring now to the gaze-tracking example application, gaze-tracking systems typically focus on the eyes. For this reason, most of the state-of-the-art methods on gaze rely on eye detection, with eye patches provided to the model at the highest possible resolution. However, in this experiment it is shown that with fewer inputs, the system is able to achieve similar performance to more complex engineered systems that aim to only solve the gaze-tracking task. The saliency sampler system was benchmarked against the iTracker dataset. Additionally, through the addition of the saliency sampler the original iTracker model was able to be simplified.

For the task network $f_t$, a standard AlexNet with the final layer changed to regress two outputs and a sigmoid function as the final activation was used. The AlexNet task network was chosen in order to directly compare with the iTracker system results. The iTracker model has four inputs: two crops for both eyes, one crop for the face and a coarse encoding for the location of the face in the image. The experimental goal was to prove that the saliency sampler system (i.e., which is simpler) can allow a normal network to deal with the complexity of the four-input iTracker model by magnifying the correct parts of a single input image.

The saliency sampler system with the task network of AlexNet was compared to the following baseline models: iTracker, AlexNet (AN), AN+Deformable Convolutions, AN+STN, and AN+Grid Estimator. For AN+Deformable Convolutions, the top three convolutional layers of an AlexNet network (i.e., which were pretrained in the ImageNet dataset) were replaced with three deformable convolution layers. The AN+STN was a Spatial Transformer Network with an affine parameterization. For AN+Grid Estimator, the network $f_s$ was modified to directly estimate the sampling grid functions u and v without a saliency map. As an error metric, the average distance error of the predicted gaze location to the ground truth gaze location within the screen space of the iPhone and iPad devices on which the ImageNet dataset was captured. Table 1, below, presents the performance results (i.e., average distance error) of the saliency sampler system in comparison with the other baseline systems for the task of determining gaze-tracking.

TABLE 1

| Model | iPad (cm) | iPhone (cm) |
|---|---|---|
| iTracker | 3.31 | 2.04 |
| Plain AlexNet (AN) | 5.44 | 2.63 |

TABLE 1-continued

| Model | iPad (cm) | iPhone (cm) |
|---|---|---|
| AN + Deformable Convolutions | 5.21 | 2.62 |
| AN + STN | 3.03 | 3.07 |
| AN + Grid Estimator | 3.91 | 2.20 |
| AN + Saliency Sampler | 3.29 | 2.03 |

The saliency sampler system achieves a performance similar to iTracker, but the saliency sampler system is implemented in a simpler more efficient manner as compared to the iTracker which enjoys the advantage of four different inputs with 227×227 pixels for each, while the saliency sampler system compresses all the information into a single image of 227×227 pixels. Furthermore, the saliency sampler system displays improved performance compared to both the STN (i.e., with difference of 2.74 cm in iPad and 1.04 cm in iPhone) and the Grid Estimator (0.62 cm in iPad and 0.17 cm in iPhone). The spatial transformer has a hard time finding the right transformation to solve the problem, while the grid estimator is not able to find the functions u and v directly without the aid of a saliency map. The deformable convolutions were found to be unsuitable for the task and the AlexNet architecture has led the network to a local minimum far from the optimum. As a result, the saliency sampler system when coupled with the task network such as AlexNet for determining gaze-tracking from image data out performs and offers a less complex implementation and few computational resources than other models.

Referring now to the fine-grained classification problem, here the goal of such a task is to distinguish between two classes where the difference is usually hidden within a small portion of the image, which becomes unresolvable at low-resolutions. In this scenario, the saliency sampler system can play an important role in that it may magnify the important parts of the image to preserve as many of the relevant pixels as possible to help the final task or decision network. For study of the saliency sampler system implemented to solve the fine-grained classification problem, the iNaturalist dataset that contains 5089 animal species was used. For the task network $f_t$, the ResNet-101 model, which has proven to show good performance within image classification, was used. An input resolution for $f_t$ and $f_s$ of 227×227 was used and the network was pretrained using the ImageNet dataset.

As baselines for this task, the same methods as before, with ResNet-101 as the base task network model were used. That is, ResNet-101 (RN), RN+STN Affine, RN+STN TPS, RN+Grid Estimator, and RN+CAM, were configured as baselines. The TPS version of STN was tested in addition to the affine (STN TPS and STN Affine), which along with the direct grid estimator were allowed access to the original 800×800 pixel images. Both localization networks for the spatial transformers are similar to $f_s$ for fairness. To test whether a high-resolution input alone could improve the performance of the baseline ResNet-101 network, crops from the maximum activated regions for the ResNet-101 227 network, using the Class Activation Map method (CAM) were provided. The class with the largest maximal activation was selected and the bounding box was computed.

Table 2, below, provides the top-1 and top-5 classification accuracies for the various models that were compared.

TABLE 2

| Model | Top-1 (%) [diff] | Top-5(%)[diff] |
|---|---|---|
| ResNet-101 227 (RN) | 52 [—] | 76 [—] |
| RN + Deformable Convolutions | 42 [−10] | 66 [−10] |
| RN + STN Affine | 45 [−7] | 72 [−4] |
| RN + STN TPS | 46 [−6] | 73 [−3] |
| RN + Grid Estimator | 52 [0] | 75 [−1] |
| RN + CAM | 54 [2] | 78 [2] |
| RN + Saliency Sampler | 58 [6] | 81 [5] |

The saliency sampler system is able to significantly outperform the ResNet-101 baseline by 6% top-1 and 5% in top-5 accuracy. The performance of the CAM-based method is closer to the saliency sampler system, however, the saliency sampler system outperforms it thanks to the ability to focus on local image regions non-uniformly and selectively zoom-in on certain features more than others. It also has a major benefit of being able to zoom in on an arbitrary number of non-collocated image locations, whereas doing so with crops involves determining the number of necessary crops beforehand or having an additional proposal mechanism. Additionally, simply feeding the ResNet-101 baseline the full resolution (800×800 pixel) image (RN (full resolution evaluation)) yields poor results. This is likely because relevant information is suppressed by a large amount of background noise in the final average pooling layer.

Figure 6:
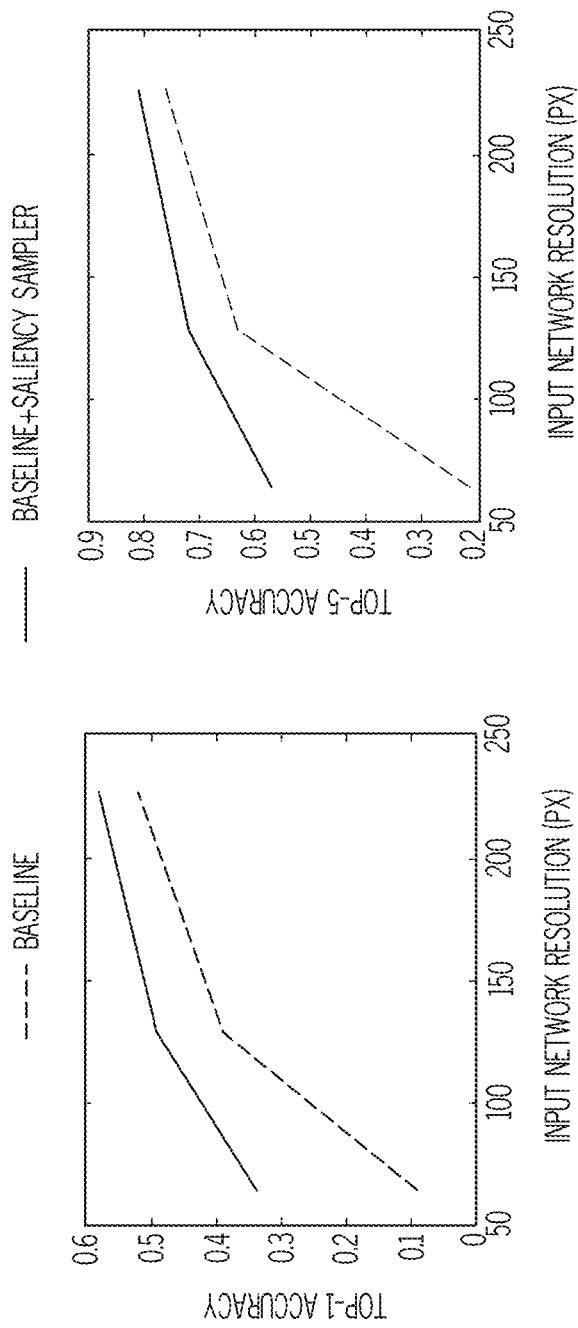
FIG. 6 depicts a graph of the accuracy of the saliency sampler system and method implemented with a task network and trained on three different resolutions, according to one or more embodiments shown and described herein.

Referring now to FIG. 6, a graph of the accuracy of the ResNet-101 model trained on three different resolutions (i.e., input resolutions of 64×64, 128×128, and 227×227 for both $f_s$ and $f_t$) is depicted. The accuracy of the networks with and without a saliency sampler system is compared. The benefit of using a saliency sampler system (i.e., layer within a CNN) is most evident at lower input resolutions, where the value of each carefully assigned input pixel is relatively higher. For the 64×64 pixel input case, the performance gap is more than 25% for both top-1 and top-5 accuracies. Since the original images are on average 800×600 pixels, the network working at resolution 227×227 does not need to significantly magnify the relevant region to get full resolution on the target object. However, for the network working at 64×64 and 128×128, this magnification needs to be more aggressive in order to get the original resolution pixels.

It should now be understood that implementing a saliency sampler system is beneficial for image tasks where the important features are small and sparse or appear across multiple image scales. The deformation introduced in the vicinity of the magnified regions could potentially discourage the network from strong deformations if another point of interest would be affected. The method proved to be simpler and faster to train that other approaches such as Spatial Transformer Networks or Deformable Convolutional Networks. The non-uniform approach to the magnification introduced by the saliency sampler system and method also enables variability of zoom over the spatial domain. This, together with the end-to-end optimization, results in a performance benefit over uniformly magnified area-of-interest crops as observed in the fine-grained classification task. Unlike in the case of the iTracker, prior knowledge about the number or relative contribution of image features is not required and these properties can change even inside a single task domain; for example, when one of the features becomes occluded.

It should be understood that the embodiments described herein are directed to systems and methods for a saliency sampler system. The saliency sampler system may generally include receiving an image having any arbitrary resolution and generating a saliency map of the image such that one or more salient features within the image are identified. A sampling grid based on the saliency map may be generated where the sampling grid defines a density of sampling for portions of the image such that a first density of sampling for the one or more salient features is greater than a second density of sampling for non-salient features. The image may then be sampled based on the saliency map and/or the sampling grid thereby generating the a sampled image for use in further layers of the task network of a CNN.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving, with a computing device, an image;
   implementing, with the computing device, a neural network comprising a saliency-based distortion layer trained to:
      learn one or more salient features in the image corresponding to a predefined task,
      generate a saliency map of the image including the learned one or more salient features, and
      sample the image based on the saliency map such that the one or more salient features are sampled at a first density of sampling and at least one portion of the image other than the one or more salient features are sampled at a second density of sampling, wherein the first density of sampling is greater than the second density of sampling, thereby creating a distorted sampled image where more salient features are enlarged compared to less salient features that are less salient than the more salient features; and
   storing the distorted sampled image in a non-transitory computer readable memory.

2. The method of claim 1, further comprising:
   generating a sampling grid based on the saliency map, wherein the sampling grid defines a density of sampling for portions of the image; and
   sampling the image based on the sampling grid.

3. The method of claim 1, further comprising:
   retrieving the distorted sampled image from the non-transitory computer readable memory; and
   inputting the distorted sampled image into a task network for the predefined task, the task network configured to estimate a gaze position of a creature within the image.

4. The method of claim 1, further comprising:
   retrieving the distorted sampled image from the non-transitory computer readable memory; and
   inputting the distorted sampled image into a task network for the predefined task, the task network configured to determine a classification of an object within the image.

5. The method of claim 1, wherein the step of generating the saliency map of the image implements a saliency network trained to learn the one or more salient features for the predefined task of determining a gaze position of a creature within the image.

6. The method of claim 1, wherein the step of generating the saliency map of the image implements a saliency network trained to learn the one or more salient features for the predefined task of determining a classification of an object within the image.

7. The method of claim 1, further comprising:
   down-sampling the image from an original image; and
   storing both the image and the original image in the non-transitory computer readable memory.

8. The method of claim 2, wherein the step of sampling the image based on the sampling grid further comprises:
   retrieving an original image that the image was generated from; and
   sampling the original image based on the sampling grid.

9. A computer-implemented system comprising:
   a saliency network;
   a grid generator;
   a sampler; and
   a processor and a non-transitory computer readable memory storing computer readable instructions that, when executed by the processor, cause the processor to:
      receive an image;
      implement a neural network comprising a saliency-based distortion layer trained to:
         learn one or more salient features within the image corresponding to a predefined task,
         generate, with the saliency network, a saliency map of the image including the learned one or more salient features,
         generate, with the grid generator, a sampling grid based on the saliency map, wherein the sampling grid defines a density of sampling for portions of the image such that the one or more salient features are sampled at a first density of sampling and at least one portion of the image other than the one or more salient features are sampled at a second density of sampling, and wherein the first density of sampling is greater than the second density of sampling, and
         sample, with the sampler, the image based on the sampling grid, thereby generating a distorted sampled image where more salient features are enlarged compared to less salient features that are less salient than the more salient features; and
      store the distorted sampled image in the non-transitory computer readable memory.

10. The computer-implemented system of claim 9, further comprising a display communicatively coupled to the processor and the non-transitory computer readable memory, wherein the computer readable instructions, when executed by the processor, further causes the processor to:
    configure the distorted sampled image for display; and
    display the distorted sampled image on the display.

11. The computer-implemented system of claim 9, wherein the computer readable instructions, when executed by the processor, further causes the processor to:
    retrieve the distorted sampled image from the non-transitory computer readable memory; and
    input the distorted sampled image into a task network for the predefined task, the task network configured to estimate a gaze position of a creature within the image.

12. The computer-implemented system of claim 9, wherein the computer readable instructions, when executed by the processor, further causes the processor to:
retrieve the distorted sampled image from the non-transitory computer readable memory; and
input the distorted sampled image into a task network for the predefined task, the task network configured to determine a classification of an object within the image.

13. The computer-implemented system of claim 9, wherein the saliency network is trained to learn the one or more salient features for the predefined task of determining a gaze position of a creature within the image.

14. The computer-implemented system of claim 9, wherein the saliency network is trained to learn the one or more salient features for the predefined task of determining a classification of an object within the image.

15. The computer-implemented system of claim 9, wherein the computer readable instructions, when executed by the processor, further causes the processor to:
down-sample the image from an original image; and
store both the image and the original image in the non-transitory computer readable memory.

16. The computer-implemented system of claim 9, wherein when the step of sampling the image, with the sampler, based on the sampling grid is executed by the processor, the computer readable instructions cause the processor to:
retrieve an original image that the image was generated from; and
sample the original image based on the sampling grid.

17. A system comprising:
a camera configured to capture a higher resolution image;
a computing device having a processor and a non-transitory computer readable memory communicatively coupled to the camera; and
a computer readable instruction set that, when executed by the processor, causes the processor to:
receive the higher resolution image from the camera;
down-sample the higher resolution image to a lower resolution image, wherein a resolution of the lower resolution image is lower than a resolution of the higher resolution image;
implement, with the computing device, a neural network comprising a saliency-based distortion layer trained to:
learn one or more salient features within the lower resolution image corresponding to a predefined task,
generate, with a saliency network, a saliency map of the lower resolution image including the learned one or more salient features,
generate, with a grid generator, a sampling grid based on the saliency map, wherein the sampling grid defines a density of sampling for portions of the lower resolution image such that the one or more salient features are sampled at a first density of sampling and at least one portion of the lower resolution image other than the one or more salient features are sampled at a second density of sampling, and wherein the first density of sampling is greater than the second density of sampling, and
sample, with a sampler, the higher resolution image based on the sampling grid, thereby generating a distorted sampled image where more salient features are enlarged compared to less salient features that are less salient than the more salient features; and
store the distorted sampled image in the non-transitory computer readable memory.

18. The system of claim 17, further comprising a display communicatively coupled to the computing device, wherein the computer readable instruction set, when executed by the processor, further causes the processor to:
configure the distorted sampled image for display; and
display the distorted sampled image on the display.

19. The system of claim 17, wherein the saliency network is trained to identify the one or more salient features for a task of determining a gaze position of a creature captured by the camera, and wherein the computer readable instruction set, when executed by the processor, further causes the processor to:
retrieve the distorted sampled image from the non-transitory computer readable memory; and
input the distorted sampled image into a task network for the predefined task, the task network configured to estimate the gaze position of the creature.

20. The system of claim 17, wherein the saliency network is trained to identify the one or more salient features for a task of determining a classification of an object captured by the camera, and wherein the non-transitory computer readable memory, when executed by the processor, further causes the processor to:
retrieve the distorted sampled image from the non-transitory computer readable memory; and
input the distorted sampled image into a task network for the predefined task, the task network configured to determine the classification of the object.

21. The method of claim 1, wherein the first density of sampling and the second density of sampling each define a percentage or amount of pixels sampled from a portion of the image during sampling.

* * * * *